(12) United States Patent
Grund et al.

(10) Patent No.: US 7,677,145 B2
(45) Date of Patent: Mar. 16, 2010

(54) CUTTING INSERT, CUTTING INSERT TOOL, AND METHOD FOR MACHINING A WORKPIECE

(75) Inventors: Christian Grund, Willich (DE); Karl-Josef Schiefer, Forchheim (DE); Siegmar Nikstat, Haltenstadt-Waldsiedlung (DE)

(73) Assignee: Kennametal Inc., Latrobe, PA (US)

( * ) Notice: Subject to any disclaimer, the term of this patent is extended or adjusted under 35 U.S.C. 154(b) by 231 days.

(21) Appl. No.: 11/755,573

(22) Filed: May 30, 2007

(65) Prior Publication Data

US 2007/0292226 A1 Dec. 20, 2007

Related U.S. Application Data

(63) Continuation-in-part of application No. 29/270,452, filed on Dec. 22, 2006.

(30) Foreign Application Priority Data

May 31, 2006 (DE) .................. 10 2006 025 293

(51) Int. Cl.
  *B23B 3/00* (2006.01)
  *B23C 5/20* (2006.01)
(52) U.S. Cl. .................. 82/1.11; 407/113; 407/67
(58) Field of Classification Search .............. 407/48, 407/40, 53, 103, 33, 34, 64, 113–116, 107, 407/30, 66, 67; 82/1.11

See application file for complete search history.

(56) References Cited

U.S. PATENT DOCUMENTS

| | | | | |
|---|---|---|---|---|
| 4,840,518 A | * | 6/1989 | Plutschuck et al. | ........... 407/113 |
| 5,536,119 A | * | 7/1996 | Werner et al. | .................. 407/36 |
| 5,584,616 A | * | 12/1996 | Katbi et al. | ................. 407/114 |
| 5,829,927 A | * | 11/1998 | Nakamura et al. | .......... 408/230 |
| 5,924,824 A | * | 7/1999 | Satran et al. | ................... 407/34 |
| 6,146,065 A | * | 11/2000 | Isaksson | ..................... 407/114 |
| 6,840,716 B2 | * | 1/2005 | Morgulis et al. | .............. 407/34 |

FOREIGN PATENT DOCUMENTS

| | | |
|---|---|---|
| DE | 19 33 926 U1 | 3/1966 |
| DE | 40 03 148 A1 | 8/1990 |
| DE | 199 43 006 A1 | 3/2001 |
| DE | 10 346 790 A1 | 5/2005 |
| EP | 0 350 938 B1 | 1/1990 |
| WO | WO 97/12711 A1 | 4/1997 |

\* cited by examiner

*Primary Examiner*—Willmon Fridie
(74) *Attorney, Agent, or Firm*—Larry R. Meenan

(57) ABSTRACT

This application relates to a cutting insert and method for machining a workpiece. This application further relates to a method for the machining of a workpiece using such an indexable insert. In this case, the term "machining" means, among other things, the first-time machining and/or a re-profiling of a wheel or of a brake disc of a wheel set of a railway vehicle. An object of at least one possible embodiment of the present application is to create a cutting insert that is as economical as possible. An additional object of at least one possible embodiment of the present application is the most effective method possible and a lathe tool that is well-suited for the machining of a workpiece, such as for the copy turning and/or for the first-time machining and/or for the re-profiling of a wheel or of a brake disc of a wheel set of a railway vehicle, using a cutting insert described herein.

20 Claims, 7 Drawing Sheets

FIG. 5
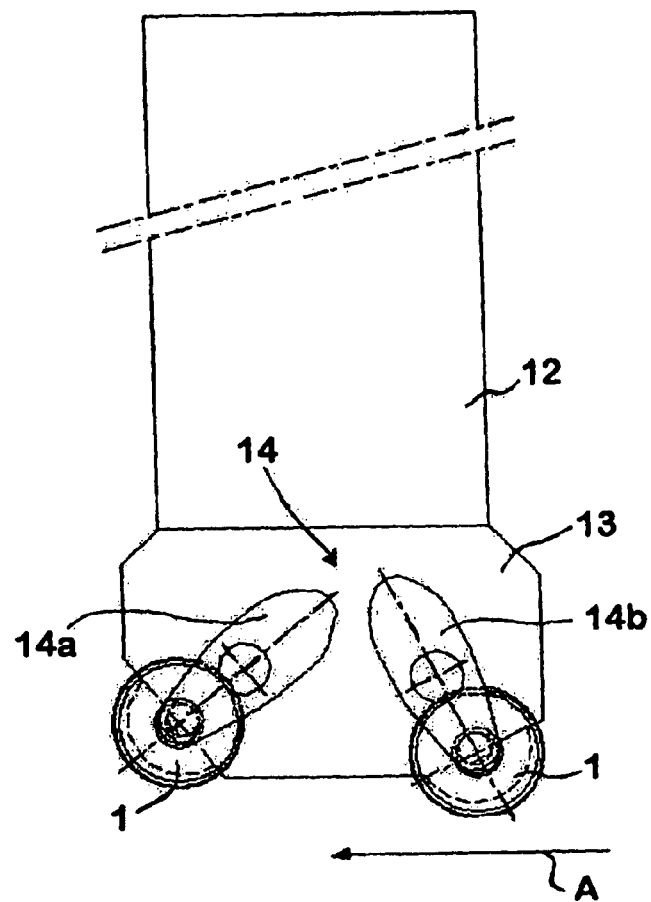
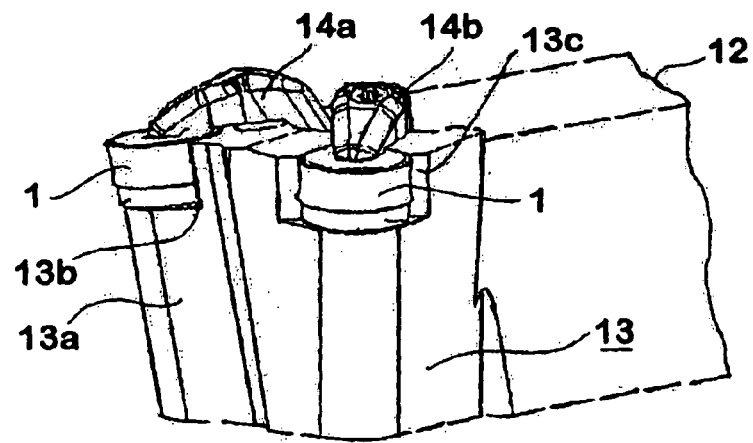
FIG. 6

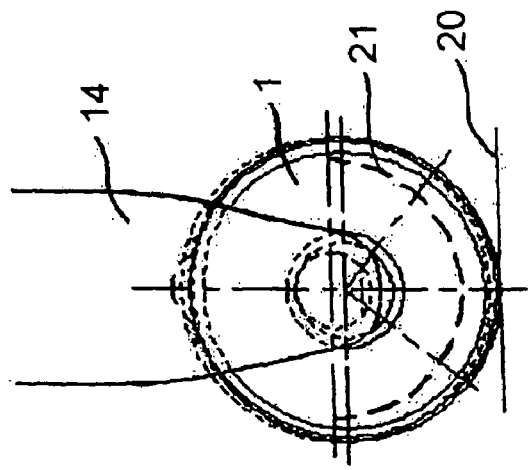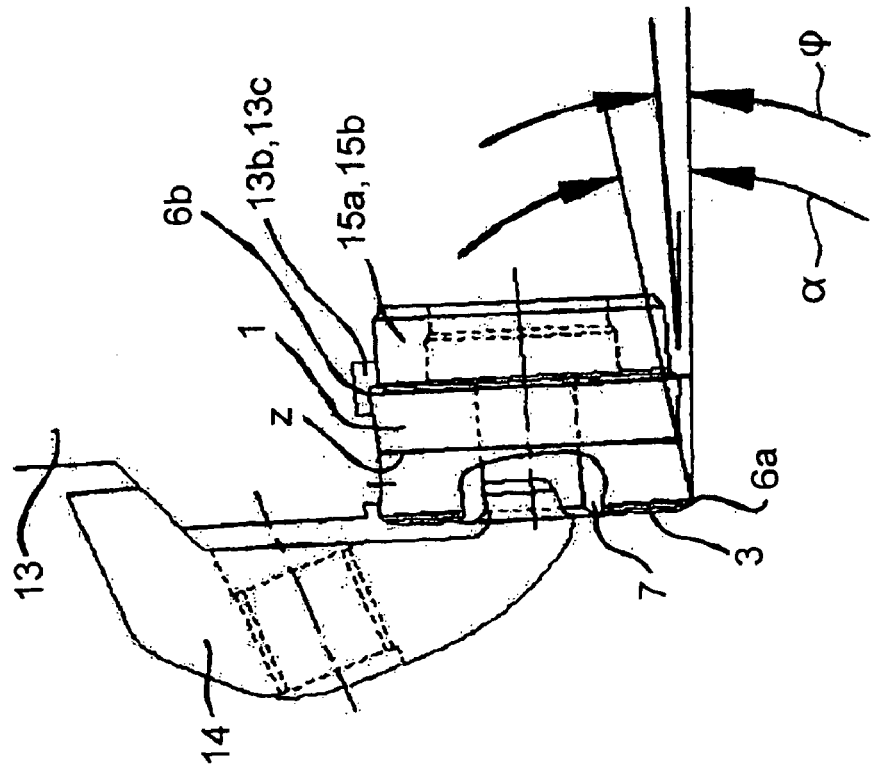

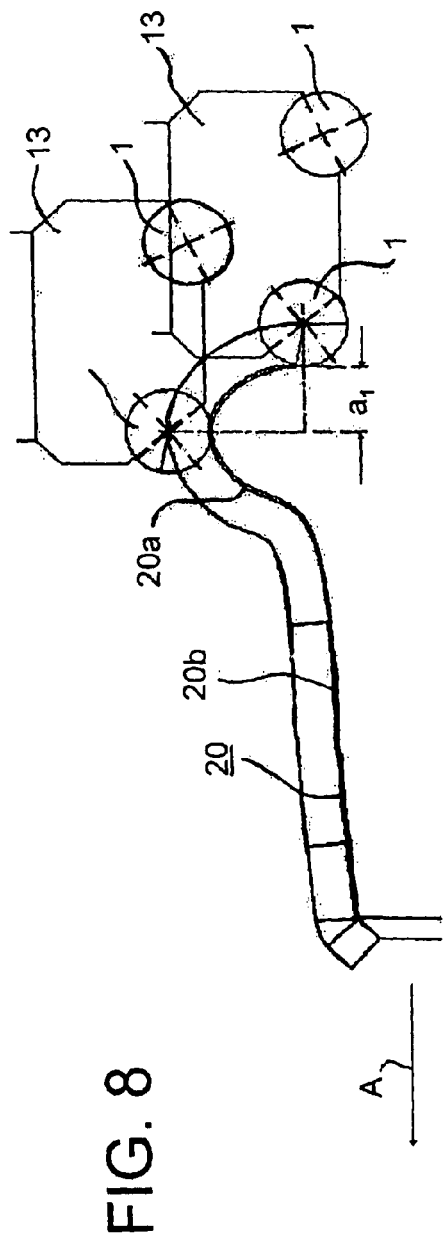
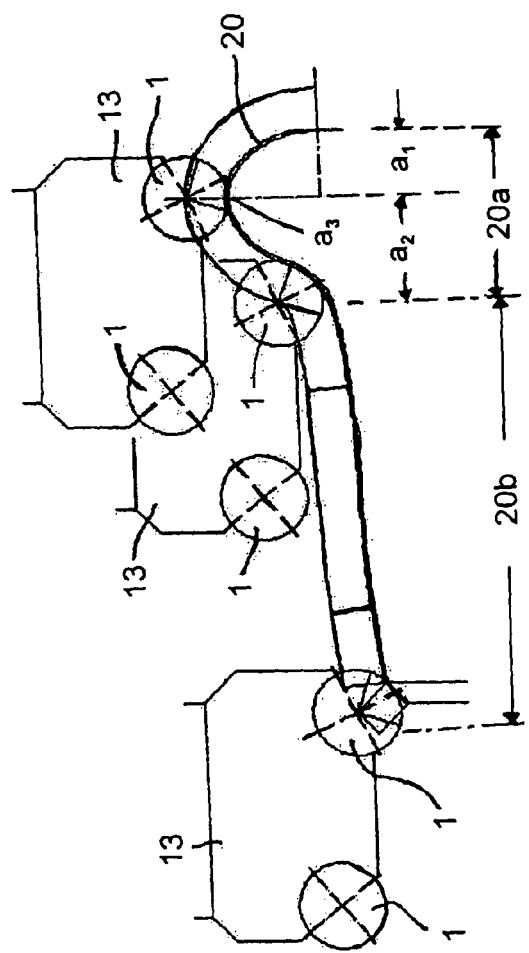
FIG. 8
FIG. 9

FIG. 10
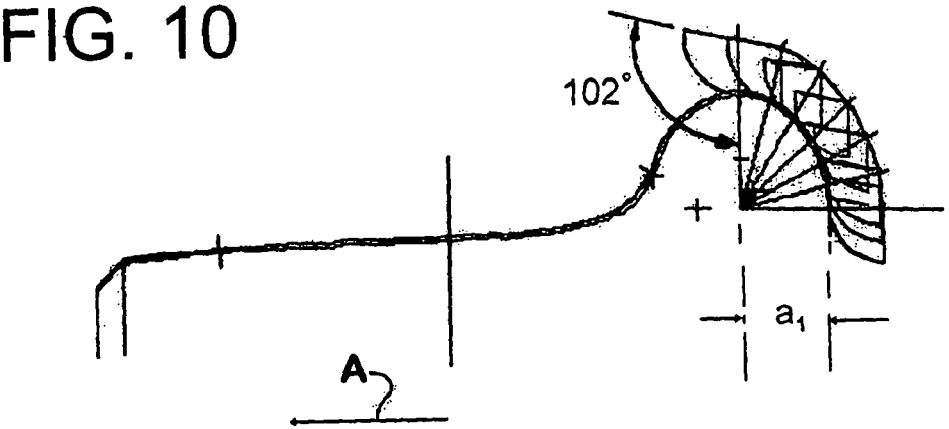
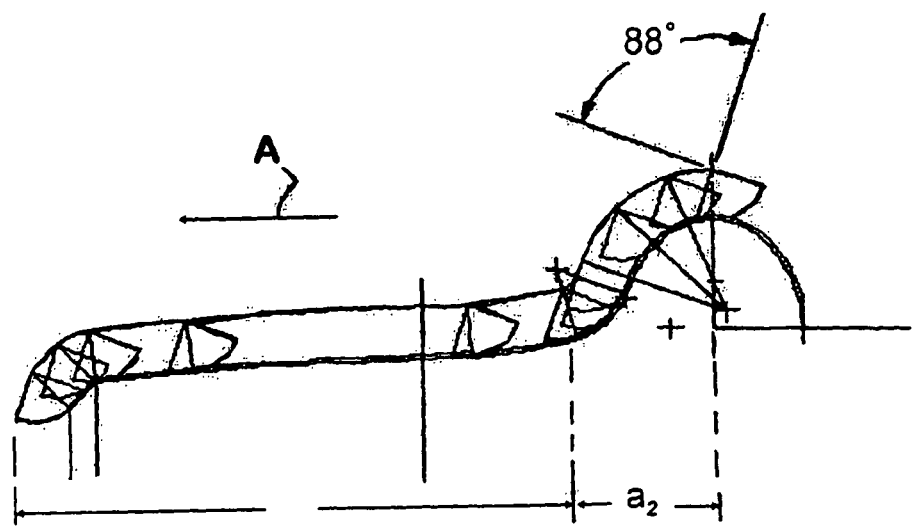
FIG. 11

CUTTING INSERT, CUTTING INSERT TOOL, AND METHOD FOR MACHINING A WORKPIECE

RELATED U.S. PATENT APPLICATION

U.S. patent application Ser. No. 29/270452, filed on Dec. 22, 2006, having inventors Christian GRUND, Dr. Karl Josef SCHIEFER, and Michael NIKSTAT, corresponding Federal Republic of Germany Patent Application No. 406 03 290.4, and title "MACHINING INSERT FOR THE INITIAL MACHINING AND/OR THE REPROFILING OF A DISC OF A DISC BRAKE FOR AT LEAST ONE WHEEL OF A VEHICLE THAT RUNS ON RAILS".

BACKGROUND

1. Technical Field

This application relates to a cutting insert and method for machining a workpiece. This application further relates to a method for the machining of a workpiece using such an indexable insert. In this case, the term "machining" means, among other things, the first-time machining and/or a re-profiling of a wheel or of a brake disc of a wheel set of a railway vehicle.

2. Background Information

In one method for the re-profiling of railway wheel sets described in German Patent Publication No. 40 03 148 A1, a lathe tool that can be moved in two different directions with two cutting bits, each with two cutting edges, is used. Because cutting bits of this type are subject to not insignificant wear, these cutting bits are replaceably mounted on the lathe tool, depending on the type of cutting inserts used.

OBJECT OR OBJECTS

An object of at least one possible embodiment of the present application is to create a cutting insert that is as economical as possible. An additional object of at least one possible embodiment of the present application is the most effective method possible and a lathe tool that is well-suited for the machining of a workpiece, such as for the copy turning and/or for the first-time machining and/or for the re-profiling of a wheel or of a brake disc of a wheel set of a railway vehicle, using a cutting insert described herein.

SUMMARY

At least one possible embodiment of the present application teaches that this object can be accomplished by a cutting insert for the machining of a workpiece with a round cutting bit with a first circular surface and with a side face that forms a round cutting edge with the end face, wherein the round cutting bit is cylindrical and forms a second round cutting edge with a second circular end face which is opposite the first end face, and the side face forms a tool flank with a positive clearance angle, both with the first end face and with the second end face. Developments of at least one possible embodiment of the present application are described herein.

At least one possible embodiment of a cutting insert is a cylindrical round cutting bit with two corner or cutting surfaces and two round cutting edges, each of which forms a positive clearance angle with the side face of the round cutting bit. The respective clearance angle is 5 degrees to 10 degrees, possibly 6 degrees to 8 degrees, or even 7.5 degrees. The round cutting bit is thereby advantageous symmetrically designed, so that the side face area that is adjacent to the respective round cutting edge functions as a tool flank. If the cutting insert is intended for use at an insertion angle of approximately 4 degrees in a tool holder or is similarly inserted tilted or inclined, when the cutting insert is used on the workpiece, the resulting normal or total clearance angle is approximately 11 degrees, or possibly approximately 11.5 degrees.

For this purpose, the round cutting bit has, in the vicinity of the side face, a contour with a reduced diameter, or in other words, a contour cinched at the waist. The side face area that forms the respective flank therefore extends between the corresponding round cutting edge and the plane of symmetry or center plane of the round cutting bit that runs at a right angle to the cylinder axis of the round cutting bit. The side face and/or each of the side faces areas can make the turn in the form of several steps or a polygon shape. However, the cinched contour of the side face is formed by an inward curvature with a radius, so that the side face of the cylindrical round cutting bit is cut away or curved inward in a circular arc. The respective flank and the end or cutting surface of the round cutting bit that corresponds to it therefore forms a wedge angle of less than 90 degrees.

At least one possible embodiment is advantageously used in the form of an indexable cutting insert and is therefore substantially economical. In at least one possible embodiment for copy turning—and thereby for the initial machining or for the re-profiling of a wheel or of a brake disc of a railway vehicle wheel set—the cutting insert can not only be used in the manner of a one-sided round cutting bit by turning it in segments a plurality of times in corresponding circular arc segments of the round cutting. On account of its use as an indexable cutting insert, the cutting insert can be used just as frequently with the additional round cutting edge by rotating the cutting bit by an appropriate angle in the tool holder.

Compared to a round cutting plate with a round cutting bit in the shape of a cone or a truncated cone, e.g. of the type described in European Patent Publication No. 0 350 938 B1, the cutting insert, in at least one possible embodiment of the present application, can be used practically twice as long before it has become worn to the point where replacement is required. The cutting insert therefore combines the advantages of a positive round cutting bit with the advantages of an indexable cutting plate in the manner of a double round cutting bit. To achieve a clearance angle of approximately 11 degrees, the insertion angle in the tool holder must be kept small enough, at approximately 4 degrees, so that during use on the workpiece there is a practically negligible difference from the circular shape and thus only an extremely low deformation during the machining, such as during the copy turning of a wheel of a railway wheel set.

At least one possible embodiment of the present application teaches a method for the machining of a workpiece, such as for the first-time machining and/or re-profiling of a wheel of a wheel set of a railway vehicle, in which by means of a lathe tool with a tool holder that holds at least one cutting insert, a workpiece contour is machined which has a first area which is similar to the running surface and an adjacent second area which is similar to a wheel flange. Developments of at least one possible embodiment of the present application are described herein.

On a lathe tool that is well-suited for the execution of the method, the cutting insert, in at least one possible embodiment of the present application, is used at an approximate insertion angle $\phi < 5$ degrees, or possibly approximately $\phi = 4$ degrees. A corresponding tool holder thereby advantageously holds two such cutting inserts. These cutting inserts are detachably held at a distance from each other and positioned by means of a clamping system. The cutting inserts, which are possibly manufactured by pressing from a ceramic material, advantageously have a through hole and/or, in the vicinity of each end face or cutting surface, a spherical recess in which the respective clamping claw is engaged. This arrangement makes possible a positive and non-positive, or in other words, firm and adjustable mounting of the respective cutting insert in or on the tool holder of the lathe tool.

At least one possible embodiment of the present application is a method well-suited for the copy turning process, in which a workpiece contour is machined with a first area that resembles a running surface (running surface area) and with an adjacent second area that resembles a wheel flange (wheel flange area). It is thereby effective if, to machine the workpiece or to machine the contour, the lathe tool is advanced in the working direction and can be moved at a right angle to the working direction, although it need not be lifted from the workpiece, to replace the tool, for example. Therefore, the machining of the workpiece contour possibly takes place in an area that begins in the wheel flange area and proceeds in a direction of working toward the running surface area. For this purpose, two cutting inserts are located on the tool holder, one behind the other in the working direction. A first segment of the wheel flange area is worked and machined using the first cutting insert, which is in the forward position in the working direction.

For the processing of this first segment of the wheel flange area, the first cutting insert with its one round cutting edge can be rotated into a plurality of positions with corresponding circular segments, and then turned over and again rotated into a corresponding number of positions.

With the second cutting insert, which is behind the first cutting insert in the working direction, the second segment of the wheel flange area is advantageously machined between its apex and the beginning of the running surface area, along with this entire running surface area. Within this area of movement of the second cutting insert, the cutting insert can also be rotated several times and turned over before this second cutting insert becomes completely worn and has to be replaced. Each of the cutting inserts can therefore be used economically. The lathe tool can also be used effectively.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Possible embodiments of the present application are explained in greater detail below and are illustrated in the accompanying drawings, in which:

FIG. 5 is a schematic view of a lathe tool with a tool holder with two clamped cutting inserts as illustrated in FIG. 1;

FIG. 6 is a view in perspective of the lathe tool illustrated in FIG. 5;

FIG. 7A shows the cutting insert in the tipped inserted position in a side view;

FIG. 7B shows the cutting insert in an overhead view;

FIGS. 8 and 9 show the lathe tool with two cutting inserts in different machining positions for the copy turning of a wheel of a railway wheel set;

FIGS. 10 and 11 are schematic illustrations of different rotational positions of the cutting insert in the tool holder for the machining of different segments or areas of the workpiece for copy turning.

Parts that correspond to one another in all the figures are provided with the same reference number.

DESCRIPTION OF EMBODIMENT OR EMBODIMENTS

Figure 1:
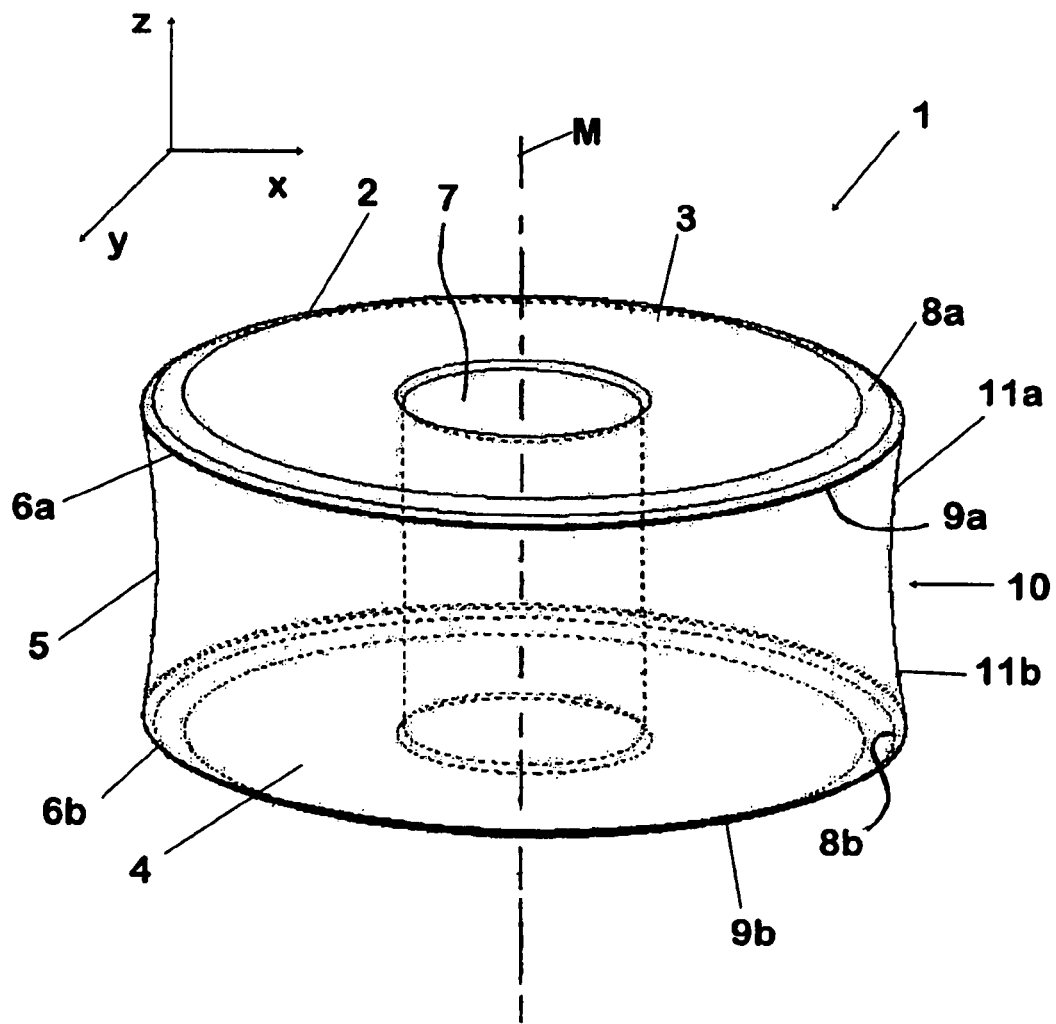
FIG. 1 is a view in perspective of a cutting insert with two round cutting edges and with tool flanks formed by an inward curvature of the side face.

The cutting insert 1 illustrated in FIGS. 1 to 4 has a generally and/or substantially cylindrical round cutting bit 2 with a first circular end face or cutting surface 3 and with a second circular end face or cutting surface 4 at some distance from the first, and with a cinched side face 5. The side face 5 is cinched or curved inward in a circular fashion with respect to the center axis M of the round cutting bit 2.

Figure 2:
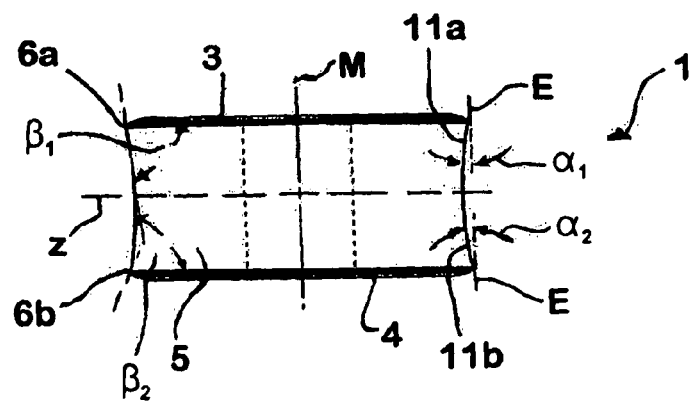
FIG. 2 is a side view of the cutting insert illustrated in FIG. 1.

Alternatively to the cinched contour in the shape of a circular arc, the side face can also be in the shape of a polygon. The essential feature is that the side face 5 is shaped so that the outside diameter of the round cutting bit 2 decreases as continuously as possible in the z-direction from the respective end face 3, 4 toward the common central plane of symmetry Z (FIG. 2).

The upper end face 3 in FIG. 1 forms a first round cutting edge 6a with the side face 5. Analogously, the lower end face 4 shown in FIG. 1 forms a second round cutting edge 6b with the side face 5. The cutting insert 1 has a central mounting opening 7, which in the illustrated exemplary embodiment is realized in the form of a central passage hole. Alternatively, central spherical-shaped recesses can be provided in each of the end faces 3, 4 as mounting openings 7.

Figure 3:
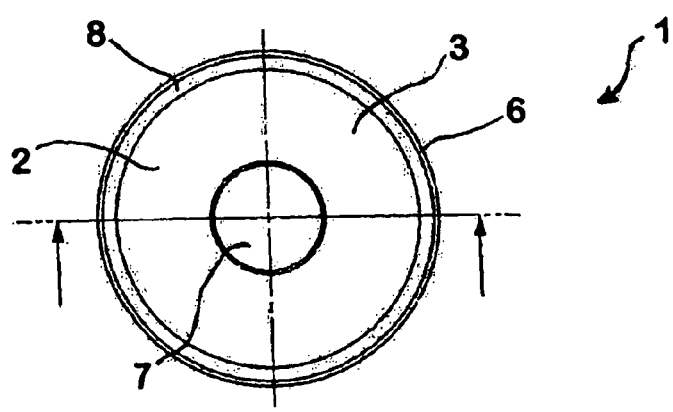
FIG. 3 is a plan view of the cutting insert from overhead.
Figure 4:
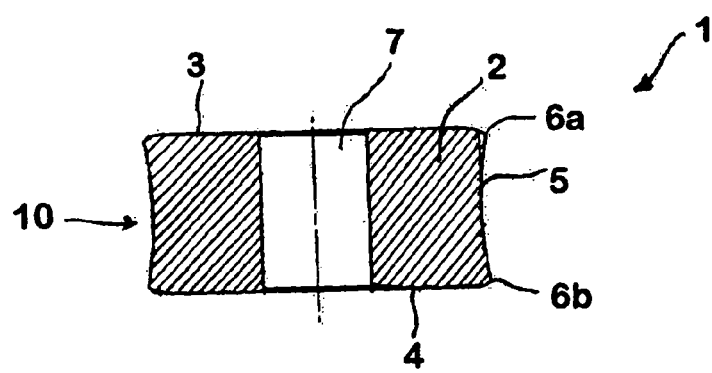
FIG. 4 shows the cutting insert in a sectional view along Line IV-IV in FIG. 3.

As shown relatively clearly in FIG. 3, the two end faces 3, 4 are each surrounded by a protective bevel in the form of a double-edged bevel 8a, 8b which extends to the respective round cutting edge 6a or 6b in the radial direction (x direction). Adjacent to the double-edged bevel 8a, 8b, toward the side face 5, there are cylindrical edges 9a and 9b respectively.

The cinched contour, which is also called the inward curvature 10 below, or circular arc-shaped inward contour of the side face 5 of the round cutting bit 2 is created, for example, during the initial machining, such as by grinding, of a cylindrical round cutting bit 2 that was pre-fabricated by pressing a cutting material in a pressing process. The cutting material can be a carbide material. In at least one possible embodiment of the present application, however, a ceramic material is used as the cutting material for the manufacture of the round cutting bit 2.

As illustrated in FIG. 2, on account of the inward curvature 2 of the side face 5 of the round cutting bit 2 below the respective round cutting edges 6a, 6b, corresponding tool flanks 11a, 11b are formed, each with a positive clearance angle $\alpha_1$ and $\alpha_2$ respectively. The corresponding wedge angles $\beta_1$, $\beta_2$ between the respective end faces 3 and 4 and the side face are therefore less than 90 degrees ($\beta_1=\beta_2<90$ degrees).

In at least one possible embodiment of the present application, the clearance angle $\alpha_1$, $\alpha_2$ is approximately 7.5 degrees ($\alpha_1=\alpha_2=7.5$ degrees). The clearance angle $\alpha_1$, $\alpha_2$ is thereby always measured between a plane E (yz plane) that is perpendicular or substantially perpendicular to the two end faces 3, 4 and the surface areas of the side face 5 that form the tool flanks 11a, and 11b respectively between the respective round cutting edges 6, 7 and the central plane of symmetry Z.

FIGS. 5 and 6 show, in an overhead view and in a perspective view respectively, a lathe tool 12 with a tool holder 13, on which two cutting inserts 1 as illustrated in FIGS. 1 to 4 are mounted one behind the other in the working direction A and at some distance from each other by means of a clamping system 14 with two releasable clamp claws 14a, 14b. The cutting inserts 1 are inserted in recesses 13b, 13c that are provided in the tool holder 13 on its machining side 13a.

As shown in FIGS. 7A and 7B, the cutting inserts 1 are positioned in the tool holder 13 in a slightly tipped or inclined position at an approximate insertion angle $\phi<5$ degrees, or possibly approximately $\phi=4$ degrees. The respective cutting inserts 1 are positioned in the corresponding recesses 13b, 13c of the tool holder 13 with the interposition of an insert element 15a, 15b.

As a result of this insertion angle $\phi$, with respect to the workpiece surface illustrated in FIG. 7A or surface contour in the form of a wheel surface 20 (FIG. 12), in connection with a respective clearance angle $\alpha_1$, $\alpha_2$ which is already provided on the cutting insert itself, the resulting normal clearance angle $\alpha$ of the major cutting edge is approximately 11 degrees, or possibly approximately 11.5 degrees. The combination of the respective clearance angle $\alpha_1$, $\alpha_2$ on the cutting insert itself and the insertion angle $\phi$ of the cutting insert 1 in the tool holder 13 therefore guarantees a normal clearance angle $\alpha$ of the major cutting edge that is sufficient for machining, with simultaneously very little deformation, i.e. only a slight deviation from the ideal circular shape. This situation is illustrated by the circular arc shown in a dotted line in FIG. 7B.

Figure 12:
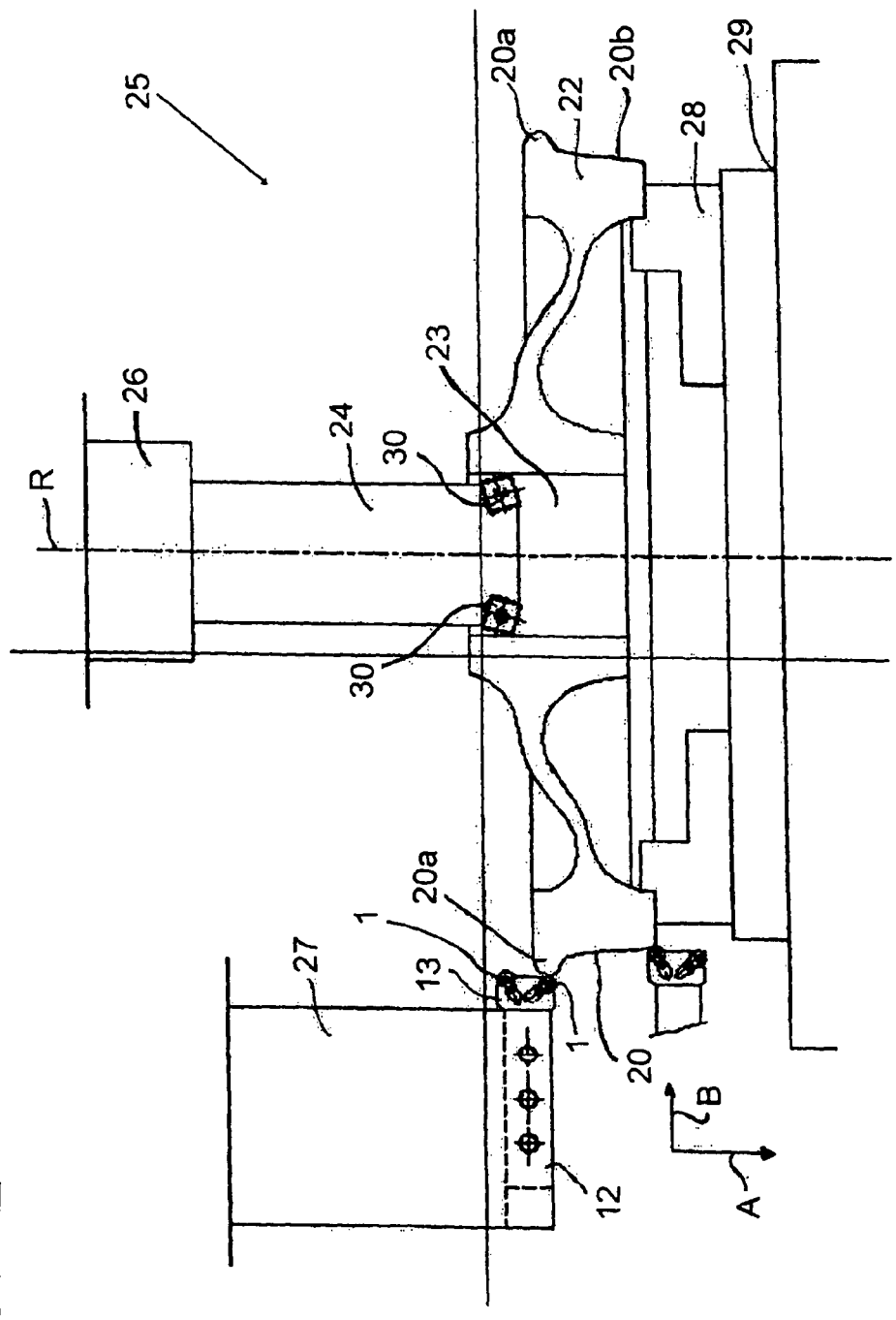
FIG. 12 is a schematic illustration of a lathe tool for the simultaneous machining of an external contour and of a central passage opening of a wheel of a wheel set of a railway vehicle.

FIGS. 8 to 11 show, in connection with FIG. 12, schematic diagrams of different machining segments in the machining of a workpiece in the form of a wheel 22 of a wheel set of a railway vehicle. FIG. 12 thereby also illustrates the simultaneous processing both of a central passage opening 23 of the wheel 22 by means of a lathe tool 24 as well as the machining (copy turning) of the wheel surface 20 on the peripheral edge along a wheel flange or wheel flange area 20a and of a running surface area 20b that is adjacent to the flange in the working direction A.

FIGS. 8 and 9 show the sequence of the machining of the surface contour of the wheel surface 20 in the working direction A, beginning from the side of the wheel flange area 20a facing away from the running surface area 20b. By means of the first cutting insert 1 of the lathe tool 12 which is positioned forward in the working direction A, first a first segment $a_1$ of the wheel flange area 20a is machined to its apex $a_3$ (FIGS. 8 and 10). As shown in FIG. 10, as a result of the angle plotted in the figure of approximately 102 degrees and the 360 degree round cutting edges 6a, 6b of the cutting insert 1, for a machining of such segments $a_1$, the first cutting insert 1 is rotated in three 120-degree angles of rotation or rotational positions in the tool holder 13. Then the first cutting insert 1 can be reversed in the tool holder 13 and again rotated into three 120-degree rotational positions in the tool holder 13. An individual cutting insert 1 can therefore be used for the machining of such segments $a_1$ of wheel flange areas 20a a total of six times before the cutting insert 1 has to be replaced on account of wear.

With regard to the processing area illustrated in FIGS. 9 and 11, the second cutting insert 1 which is behind the first cutting insert 1 in the working direction A is being used for the machining. By means of this second cutting insert 1, both the remaining second segment $a_2$ between the apex $a_3$ of the wheel flange area 20a and its transition to the running surface area 20b is are machined. For this purpose, the lathe tool 12 is advanced both in the working direction A and—with respect to the wheel 22 being machined—is also moved in the radial direction B (FIG. 12).

Along this machining area with the second segment $a_2$ of the wheel flange area 20a and with the total running surface area 20b, on account of the angle of approximately 88 degrees indicated in FIG. 11, the second cutting insert 1 can be positioned in the tool holder 13 in a total of four 90-degree angular positions or rotational positions. By reversing the second cutting insert 1 and as a result of another four 90-degree angular positions, the second cutting insert 1 can be used for machining a total of eight times before it becomes completely worn and a replacement of this second cutting insert 1 is required.

This long useful life of the two cutting inserts 1 results from the fact that each of the cutting inserts 1 has two 360-degree round cutting edges 6a, 6b, each of which can be rotated a plurality of times with a corresponding angular rotation into a plurality of angular positions in the tool holder 13 and can also be turned over. Each of the cutting inserts 1 therefore combines the advantages of a positive round cutting bit with the advantages of a reversible cutting bit. This feature has significant advantages, such as for the reprocessing and/or re-profiling of a wheel 22 of a wheel set of a railway vehicle. Machining of this type can also be performed analogously on a brake disc of a railway vehicle.

On account of the ability to use the individual cutting insert 1 a plurality of times, the machining of such a workpiece contour 20, which is called copy turning, can be achieved relatively economically.

A further increase in the economy of the operation is advantageously achieved if, by means of the vertical lathe machine 25 illustrated in FIG. 12 with two machining rams 26, 27, both the central passage boring or passage opening 23 and the running surface and wheel flange contour 20 can be machined simultaneously by lathe-turning. In this case, the wheel 22 is held on a rotating turntable 29 by means of the chuck 28. On account of the different cutting speeds at specified speeds of rotation in the vicinity of the central passage boring 23 on one hand and of the external contour or running surfaces and the wheel flange contour 20 of the wheel on the other hand, the cutting plates 30 used for the machining of the passage opening 23 are advantageously made of a carbide metal material, while the cutting inserts 1 in the form of the double round cutting bits are advantageously made of a ceramic material.

At least one possible embodiment of the present application is a cutting insert 1 with a round cutting bit 2 with a first circular end face 3 and with a side face 5 that forms a round cutting edge 6a with the end face 3, whereby the round cutting bit 2 is cylindrical and forms a second round cutting edge 6b with a second circular end face 4 that is opposite the first end face 3, and whereby the side face 5 forms a tool flank 11a, 11b with a positive clearance angle $\alpha_1$, $\alpha_2$ with both the first end face 3 and with the second end face 4. In a method for the machining of a workpiece 22, such as for the first-time machining and/or re-profiling of a wheel of a railway vehicle, the cutting insert 1 can be rotated a plurality of times and turned upside down.

All of the patents, patent applications or patent publications, which were cited in the German Examination Report dated Sep. 27, 2006, and/or cited elsewhere are hereby incorporated by reference as if set forth in their entirety herein as follows: WIPO Publication Patent No. WO 97/12711 A1, German Patent Publication No. 199 43 006 A1, German Patent Publication No. 103 46 790 A1, and German Patent Publication No. 19 33 926 U1.

The components disclosed in the various publications, disclosed or incorporated by reference herein, may possibly be used in possible embodiments of the present invention, as well as equivalents thereof.

One feature or aspect of an embodiment is believed at the time of the filing of this patent application to possibly reside broadly in a cutting insert 1 for the machining of a workpiece 22 with a round cutting bit 2 with a first circular surface 3 and with a side face 5 that forms a round cutting edge 6a with the end face 3, wherein the round cutting bit 2 is cylindrical and forms a second round cutting edge 6b with a second circular end face 4 which is opposite the first end face 3, and the side face 5 forms a tool flank 11a, 11b with a positive clearance angle $\alpha_1$, $\alpha_2$ both with the first end face 3 and with the second end face 4.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Another feature or aspect of an embodiment is believed at the time of the filing of this patent application to possibly reside broadly in the cutting insert 1, wherein the cylindrical round cutting bit 2 has a cinched contour in the vicinity of the side face 5.

The appended drawings in their entirety, including all dimensions, proportions and/or shapes in at least one embodiment of the invention, are accurate and are hereby included by reference into this specification.

Yet another feature or aspect of an embodiment is believed at the time of the filing of this patent application to possibly reside broadly in the cutting insert 1, wherein the cylindrical round cutting bit 2 has a substantially circular arc shaped inward curvature 10 in the vicinity of the side face 5.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Still another feature or aspect of an embodiment is believed at the time of the filing of this patent application to possibly reside broadly in the cutting insert 1, wherein the clearance angle $\alpha_1$, $\alpha_2$ is 5 degrees to 10 degrees, in particular 6 degrees to 8 degrees, preferably approximately 7 degrees.

All, or substantially all, of the components and methods of the various embodiments may be used with at least one embodiment or all of the embodiments, if more than one embodiment is described herein.

A further feature or aspect of an embodiment is believed at the time of the filing of this patent application to possibly reside broadly in the cutting insert 1, wherein the cylindrical round cutting bit 2 has a central mounting opening 7 in the vicinity of each of the two end faces 3, 4.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Another feature or aspect of an embodiment is believed at the time of the filing of this patent application to possibly reside broadly in the cutting insert 1, wherein each of the two end faces 3, 4 of the cylindrical round cutting bit 2 is surrounded by a protective bevel 8a, 8b, such as by a double-edge bevel.

All of the patents, patent applications and publications recited herein, and in the Declaration attached hereto, are hereby incorporated by reference as if set forth in their entirety herein.

Yet another feature or aspect of an embodiment is believed at the time of the filing of this patent application to possibly reside broadly in the cutting insert 1, wherein the cylindrical round cutting bit 2 is realized in the form of an indexable cutting insert.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Still another feature or aspect of an embodiment is believed at the time of the filing of this patent application to possibly reside broadly in the cutting insert 1, wherein the cylindrical round cutting bit 2 is made of a pressed ceramic material.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

A further feature or aspect of an embodiment is believed at the time of the filing of this patent application to possibly reside broadly in a method for the machining of a workpiece 22, in particular for the first-time machining and/or re-profiling of a wheel of a wheel set of a railway vehicle, in which by means of a lathe tool 12 with a tool holder 13 that holds at least one cutting insert 1, wherein a workpiece contour 20 is machined which has a first area 20b which is similar to the running surface and an adjacent second area 20 which is similar to a wheel flange.

The corresponding foreign and international patent publication applications, namely, Federal Republic of Germany Patent Application No. 10 2006 025 293.4, filed on May 31, 2006, having inventors Christian GRUND, Karl-Josef SCHIEFER, and Siegmar NIKSTAT, and DE-OS 10 2006 025 293.4 and DE-PS 10 2006 025 293.4, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Another feature or aspect of an embodiment is believed at the time of the filing of this patent application to possibly reside broadly in the method, wherein the lathe tool 12 machines the workpiece contour 20 in the working direction A, starting from the wheel flange-like second area 20a and moves along the adjacent first area 20b which is in the form of the running surface.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Yet another feature or aspect of an embodiment is believed at the time of the filing of this patent application to possibly reside broadly in the method, wherein with a first cutting insert 1, a first segment $a_1$ of the wheel-flange second area 20a that faces away from the first running-surface area 20b is machined.

U.S. patent application 29/270452, filed on Dec. 22, 2006, having inventors Christian GRUND, Dr. Karl Josef SCHIEFER, and Michael NIKSTAT, corresponding Federal Republic of Germany Patent Application No. 406 03 290.4, and title "MACHINING INSERT FOR THE INITIAL MACHINING AND/OR THE REPROFILING OF A DISC OF A DISC BRAKE FOR AT LEAST ONE WHEEL OF A VEHICLE THAT RUNS ON RAILS" is hereby incorporated by reference as if set forth in its entirety herein.

Still another feature or aspect of an embodiment is believed at the time of the filing of this patent application to possibly reside broadly in the method, wherein a second cutting insert 1 which is located behind the first cutting insert 1 in the working direction A approximately at the apex $a_3$ of the wheel-flange like second area 20a is moved toward this area, and the second segment $a_2$ of the wheel-flange-like first area 20a facing the running-surface-like first area 20b and the running-surface-like first area 20b are machined.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

A further feature or aspect of an embodiment is believed at the time of the filing of this patent application to possibly reside broadly in the method, wherein a central passage opening 23 of the workpiece 22 is machined simultaneously with the machining of the wheel-flange-like second area 20a and of the running-surface-like first area 20b.

The details in the patents, patent applications and publications may be considered to be incorporable, at applicant's option, into the claims during prosecution as further limitations in the claims to patentably distinguish any amended claims from any applied prior art.

Another feature or aspect of an embodiment is believed at the time of the filing of this patent application to possibly reside broadly in a lathe tool 12 for the execution of the method for the machining of a workpiece 22, in particular for the first-time machining and/or re-profiling of a wheel of a wheel set of a railway vehicle, with a tool holder 13 into which the cutting insert 1 is inserted at an insertion angle $\phi < 5$ degrees.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Yet another feature or aspect of an embodiment is believed at the time of the filing of this patent application to possibly reside broadly in the lathe tool 12, wherein the cutting insert 1 is inserted in the tool holder 13 at an insertion angle $\phi$ between 2 degrees and 4 degrees, preferably $\phi = 4$ degrees.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

Still another feature or aspect of an embodiment is believed at the time of the filing of this patent application to possibly reside broadly in the lathe tool 12, with a clamping system 14 for the positive and/or non-positive mounting of at least one cutting insert 1 on the tool holder 13.

AT LEAST PARTIAL NOMENCLATURE

1 Cutting insert
2 Round cutting bit
3, 4 End face, cutting surface
5 Side face
6a, b Round cutting edge
7 Mounting opening
8a, b Protective/double-edge bevel
9a, b Cylindrical edge
10 Inward curvature
11a, b Flank surface
12 Lathe tool
13 Tool holder
13a Machining side
13b, c Recess
14 Clamping system
14a, b Clamp claw
15a, b Insert element
16, 17 Clamping claw
20 Wheel/workpiece surface
20a Wheel-flange area
20b Running surface area
21 Circular arc
22 Wheel
23 Passage opening
24 Lathe tool
25 Vertical lathe
26, 27 Machining ram
28 Chuck
29 Turntable
30 Cutting plate
A Working direction
B Radial direction
E Plane
M Center axis
Z Plane of symmetry/center plane
a1, a2 segment
a3 Apex
α Normal clearance of the major cutting edge
α1, 2 Clearance angle
β1, 2 Wedge angle
φ Insertion angle

What is claimed is:

1. A round cutting insert for the machining of a workpiece, such as for the first-time machining and/or re-profiling of a wheel of a wheel set of a railway vehicle, said round cutting insert comprising:
    a longitudinal axis;
    a first circular end face comprising a diameter and a substantial flat portion being perpendicular to said longitudinal axis;
    a second circular end face comprising a diameter; second circular end face being disposed opposite said first circular end face;
    a first round cutting edge comprising a diameter;
        said first round cutting edge being disposed adjacent said first circular end face;
    a second round cutting edge comprising a diameter;
        said second round cutting edge being disposed opposite said first round cutting edge and being disposed adjacent said second circular end face;
    said side face comprising a plurality of cross-sections perpendicular to the longitudinal axis of said cutting insert;
    said plurality of cross-sections being circular;
    said first circular end face and said side face forming said first round cutting edge;
    said second circular end face and said side face forming said second round cutting edge;
    said side face having a first portion being disposed adjacent said first circular end face and also being disposed adjacent said first round cutting edge;
    said first portion of said side face adjacent said first circular end face forming an acute angle with said substantial flat portion of said first circular end face, which acute angle is disposed adjacent said first round cutting edge to form a positive clearance angle of said first round cutting edge;
    said side face having a second portion being disposed adjacent said second circular end face and also being disposed adjacent said second round cutting edge; and
    said second portion of said side face adjacent said second circular end face forming an acute angle with said substantial flat portion of said second circular end face, which acute angle is disposed adjacent said second round cutting edge to form a positive clearance angle of said second round cutting edge.

2. The cutting insert according to claim 1, wherein at least a portion of said plurality of circular cross-sections of said side face perpendicular to the longitudinal axis of said cutting insert being smaller than either the diameter of said first round cutting edge and said second round cutting edge, resulting in a cinched contour, or a contour with a reduced diameter, along said side face.

3. The cutting insert according to claim 2, wherein said side face being configured in an inwardly-curved, circular arc shape.

4. The cutting insert according to claim 3, wherein said positive clearance angle is one of:
    about 5 degrees to about 10 degrees;
    about 6 degrees to about 8 degrees; and
    approximately 7 degrees.

5. The cutting insert according to claim 4, wherein each of said two end faces of said cutting insert comprising a protective bevel, such as a double-edge bevel, being disposed adjacent said side face.

6. The cutting insert according to claim 5, wherein said cutting insert comprising a pressed ceramic material and being indexable; and
    said cutting insert further comprising a central mounting opening in each of said two end faces.

7. A lathe tool for the machining of a workpiece, comprising the first-time machining and/or re-profiling of a wheel of a wheel set of a railway vehicle;
    said lathe tool comprising:
        a body;
        two cutting inserts being disposed a predetermined distance apart on said body and being configured to machine and/or re-profile a wheel of a wheel set of a railway vehicle;
    each said cutting insert comprising:

a longitudinal axis;

a first circular end face comprising a diameter and a substantial flat portion being perpendicular to said longitudinal axis;

a second circular end face comprising a diameter;
second circular end face being disposed opposite said first circular end face;

a first round cutting edge comprising a diameter;
said first round cutting edge being disposed adjacent said first circular end face;

a second round cutting edge comprising a diameter;
said second round cutting edge being disposed opposite said first round cutting edge and being disposed adjacent said second circular end face;

said side face comprising a plurality of cross-sections perpendicular to the longitudinal axis of said cutting insert;
said plurality of cross-sections being circular;

said first circular end face and said side face forming said first round cutting edge;

said second circular end face and said side face forming said second round cutting edge;

at least a substantial portion of said plurality of cross-sections of said side face being smaller than either the diameter of said first round cutting edge and said second round cutting edge;

said side face having a first portion being disposed adjacent said first circular end face and also being disposed adjacent said first round cutting edge;

said first portion of said side face adjacent said first circular end face forming an acute angle with said substantial flat portion of said first circular end face, which acute angle is disposed adjacent said first round cutting edge to form a positive clearance angle of said first round cutting edge;

said side face having a second portion being disposed adjacent said second circular end face and also being disposed adjacent said second round cutting edge; and said second portion of said side face adjacent said second circular end face forming an acute angle with said substantial flat portion of said second circular end face, which acute angle is disposed adjacent said second round cutting edge to form a positive clearance angle of said second round cutting edge;

said lathe tool further comprising:
clamping devices being disposed on said body being configured to hold said cutting inserts on said body; and
each of said cutting inserts being clampable, and unclampable, by its corresponding clamping device;
each of said cutting inserts being invertable; and
each of said cutting inserts being rotatable about its longitudinal axis, thus allowing for several different portions of its corresponding cutting edge, in use, of each of said cutting inserts to be positioned to cut the workpiece.

8. The lathe tool according to claim 7, wherein at least a portion of said plurality of circular cross-sections of said side face perpendicular to the longitudinal axis of said cutting insert being smaller than either the diameter of said first round cutting edge and said second round cutting edge, resulting in a cinched contour, or a contour with a reduced diameter, along said side face.

9. The lathe tool according to claim 8, wherein said side face being configured in an inwardly-curved, circular arc shape.

10. The lathe tool according to claim 9, wherein said positive clearance angle is one of:
about 5 degrees to about 10 degrees;
about 6 degrees to about 8 degrees; and
approximately 7 degrees.

11. The lathe tool according to claim 10, wherein each of said two end faces of said cutting insert comprising a protective bevel, such as a double-edge bevel, being disposed adjacent said side face.

12. The lathe tool according to claim 11, wherein said cutting insert comprising a pressed ceramic material and being indexable; and
said cutting insert further comprising a central mounting opening in each of said two end faces.

13. A method of the first-time machining and/or re-profiling of a wheel of a wheel set of a railway vehicle with a lathe that has a lathe tool moving and turning arrangement, which lathe tool moving and turning arrangement is configured for the moving and turning of said lathe;

said lathe comprising:
a lathe tool comprising:
a body;
two cutting inserts being disposed a predetermined distance apart on said body and being configured to machine and/or re-profile a wheel of a wheel set of a railway vehicle;

each said cutting insert comprising:
a longitudinal axis;
a first circular end face comprising a diameter and a substantial flat portion being perpendicular to said longitudinal axis;
a second circular end face comprising a diameter;
second circular end face being disposed opposite said first circular end face;
a first round cutting edge comprising a diameter;
said first round cutting edge being disposed adjacent said first circular end face;
a second round cutting edge comprising a diameter;
said second round cutting edge being disposed opposite said first round cutting edge and being disposed adjacent said second circular end face;
said side face comprising a plurality of cross-sections perpendicular to the longitudinal axis of said cutting insert;
said plurality of cross-sections being circular;
said first circular end face and said side face forming said first round cutting edge;
said second circular end face and said side face forming said second round cutting edge;
at least a portion of said plurality of cross-sections of said side face being smaller than either the diameter of said first round cutting edge and said second round cutting edge;
said side face having a first portion being disposed adjacent said first circular end face and also being disposed adjacent said first round cutting edge;
said first portion of said side face adjacent said first circular end face forming an acute angle with said substantial flat portion of said first circular end face, which acute angle is disposed adjacent said first round cutting edge to form a positive clearance angle of said first round cutting edge;
said side face having a second portion being disposed adjacent said second circular end face and also being disposed adjacent said second round cutting edge; and
said second portion of said side face adjacent said second circular end face forming an acute angle with said substantial flat portion of said second circular end face, which acute angle is disposed adjacent said second round cutting edge to form a positive clearance angle of said second round cutting edge;

said lathe tool further comprising:

clamping devices being disposed on said body being configured to hold said cutting inserts on said body; and each of said cutting inserts being clampable, and unclampable, by its corresponding clamping device;

each of said cutting inserts being invertable; and each of said cutting inserts being rotatable about its longitudinal axis, thus allowing for several different portions of said first and/or second round cutting edge in use, of its corresponding cutting insert, to be positioned to cut the workpiece;

said method comprising the steps of:

rotating the workpiece in the lathe;

moving said lathe tool with said moving and turning arrangement;

first-time machining and/or re-profiling of a wheel of a wheel set of a railway vehicle;

upon wear of a portion of said first round cutting edge of its corresponding cutting insert being used for the first-time machining and/or re-profiling of a wheel of a wheel set of a railway vehicle, rotating said cutting insert about its longitudinal axis to provide a different portion of said first round cutting edge of said cutting insert, not being worn, for further machining;

upon wear of all portions of said first round cutting edge of its corresponding cutting insert being used, inverting said cutting insert to provide a portion of said second round cutting edge of said cutting insert, not being worn, for further machining; and upon wear of a portion of said second round cutting edge of a cutting insert being used for the first-time machining and/or re-profiling of a wheel of a wheel set of a railway vehicle, rotating said cutting insert about its longitudinal axis to provide a different portion of said second round cutting edge, of said cutting insert, not being worn for further machining.

14. The method according to claim 13, wherein a workpiece contour being machined comprising a first area which is similar to a running surface and an adjacent second area which is similar to a wheel flange.

15. The method according to claim 14, wherein said lathe tool machines the workpiece contour in a working direction, starting from the wheel flange-like second area and moving along the adjacent first area which is in the form of the running surface.

16. The method according to claim 15, wherein with a first cutting insert, a first segment of the wheel-flange second area that faces away from the first running-surface area is machined.

17. The method according to claim 16, wherein a second cutting insert being disposed behind said first cutting insert in the working direction approximately at the apex of the wheel-flange like second area is moved toward this area, and the second segment of the wheel-flange-like first area facing the running-surface-like first area and the running-surface-like first area are machined.

18. The method according to claim 17, wherein, a central passage opening of the workpiece is machined simultaneously with the machining of the wheel-flange-like second area and of the running-surface-like first area.

19. The method according to claim 18, wherein said lathe tool comprising a tool holder into which the cutting insert is inserted, and said insertion angle is one of:

insertion angle $\phi <$ approximately 5 degrees;

insertion angle $\phi$ between approximately 2 degrees and approximately 4 degrees; and insertion angle $\phi =$ approximately 4 degrees.

20. The method according to claim 19, wherein said lathe tool comprising a clamping system for the positive and/or non-positive mounting of at least one cutting insert on the tool holder.

* * * * *